(12) United States Patent
Bae et al.

(10) Patent No.: US 11,261,759 B2
(45) Date of Patent: Mar. 1, 2022

(54) TURBINE SUPPORT STRUCTURE, TURBINE AND GAS TURBINE USING THE SAME

(71) Applicant: DOOSAN HEAVY INDUSTRIES & CONSTRUCTION CO., LTD., Changwon-si (KR)

(72) Inventors: Jin Ho Bae, Gimhae-si (KR); Jae Hyeong Choi, Daegu (KR)

( * ) Notice: Subject to any disclaimer, the term of this patent is extended or adjusted under 35 U.S.C. 154(b) by 365 days.

(21) Appl. No.: 16/034,356

(22) Filed: Jul. 13, 2018

(65) Prior Publication Data
US 2019/0085730 A1    Mar. 21, 2019

(30) Foreign Application Priority Data
Sep. 20, 2017  (KR) .................. 10-2017-0121198

(51) Int. Cl.
*F01D 25/28* (2006.01)
*F02C 3/04* (2006.01)
(Continued)

(52) U.S. Cl.
CPC ......... *F01D 25/285* (2013.01); *F01D 25/265* (2013.01); *F02C 3/04* (2013.01); *F16M 1/04* (2013.01); *F05D 2220/32* (2013.01); *F05D 2230/642* (2013.01); *F05D 2240/14* (2013.01); *F05D 2240/90* (2013.01); *F05D 2260/31* (2013.01)

(58) Field of Classification Search
CPC ...... F01D 25/285; F01D 25/265; F01D 25/24; F01D 25/28; F02C 3/04; F16M 1/04; F05D 2220/32; F05D 2230/642; F05D 2240/14; F05D 2240/90; F05D 2260/31
See application file for complete search history.

(56) References Cited

U.S. PATENT DOCUMENTS

| 3,628,884 | A | * | 12/1971 | Mierley, Sr. | .......... F04D 29/624 |
| | | | | | 415/213.1 |
| 4,050,660 | A | * | 9/1977 | Eggmann | ................ F01D 25/28 |
| | | | | | 248/676 |

(Continued)

FOREIGN PATENT DOCUMENTS

| JP | 2014-177888 A | 9/2014 |
| KR | 10-1482573 B1 | 1/2015 |
| KR | 10-1546343 B1 | 8/2015 |

*Primary Examiner* — Courtney D Heinle
*Assistant Examiner* — Andrew Thanh Bui
(74) *Attorney, Agent, or Firm* — Harvest IP Law, LLP

(57) ABSTRACT

A turbine support structure supports a turbine casing and is configured to be movable when the turbine casing is thermally deformed while a gas turbine is operated, thus preventing a fatigue fracture of the turbine casing from occurring. The turbine support structure includes a pair of supports, each having an upper and lower end, for supporting respective opposite side surfaces of the turbine casing at the upper end of either support; and a movable unit installed at the lower end of each support and configured to movably support the lower end of the support. The movable unit is spaced outwardly from the corresponding opposite side surface of the turbine casing, so that the corresponding support inclines toward the turbine casing and is rotatable. The lower end of each support is rotatably coupled to the corresponding movable unit so that the support is rotatable toward an axis of the turbine casing.

14 Claims, 8 Drawing Sheets

(51) Int. Cl.
*F01D 25/26* (2006.01)
*F16M 1/04* (2006.01)

(56) References Cited

U.S. PATENT DOCUMENTS

| | | | | |
|---|---|---|---|---|
| 4,053,189 A | * | 10/1977 | Novotny | F01D 25/162 |
| | | | | 384/476 |
| 4,440,265 A | * | 4/1984 | Spagnoli | B66F 7/04 |
| | | | | 182/129 |
| 6,279,309 B1 | * | 8/2001 | Lawlor | F01D 25/285 |
| | | | | 60/39.35 |
| 7,036,318 B1 | * | 5/2006 | Munson, Jr. | F01D 15/10 |
| | | | | 60/776 |
| 7,963,542 B2 | * | 6/2011 | Doll | F16M 3/00 |
| | | | | 280/404 |
| 8,001,790 B2 | * | 8/2011 | Ichiryu | F02C 7/20 |
| | | | | 60/796 |
| 8,851,441 B2 | * | 10/2014 | Acuna | F01D 25/285 |
| | | | | 248/554 |
| 9,752,505 B2 | * | 9/2017 | Roh | F01D 25/28 |
| 10,060,449 B2 | * | 8/2018 | I | F04D 19/00 |
| 2010/0272558 A1 | * | 10/2010 | Black | F01D 25/14 |
| | | | | 415/142 |
| 2013/0199009 A1 | * | 8/2013 | Holmes | F04D 29/644 |
| | | | | 29/281.4 |

* cited by examiner

【FIG. 1】
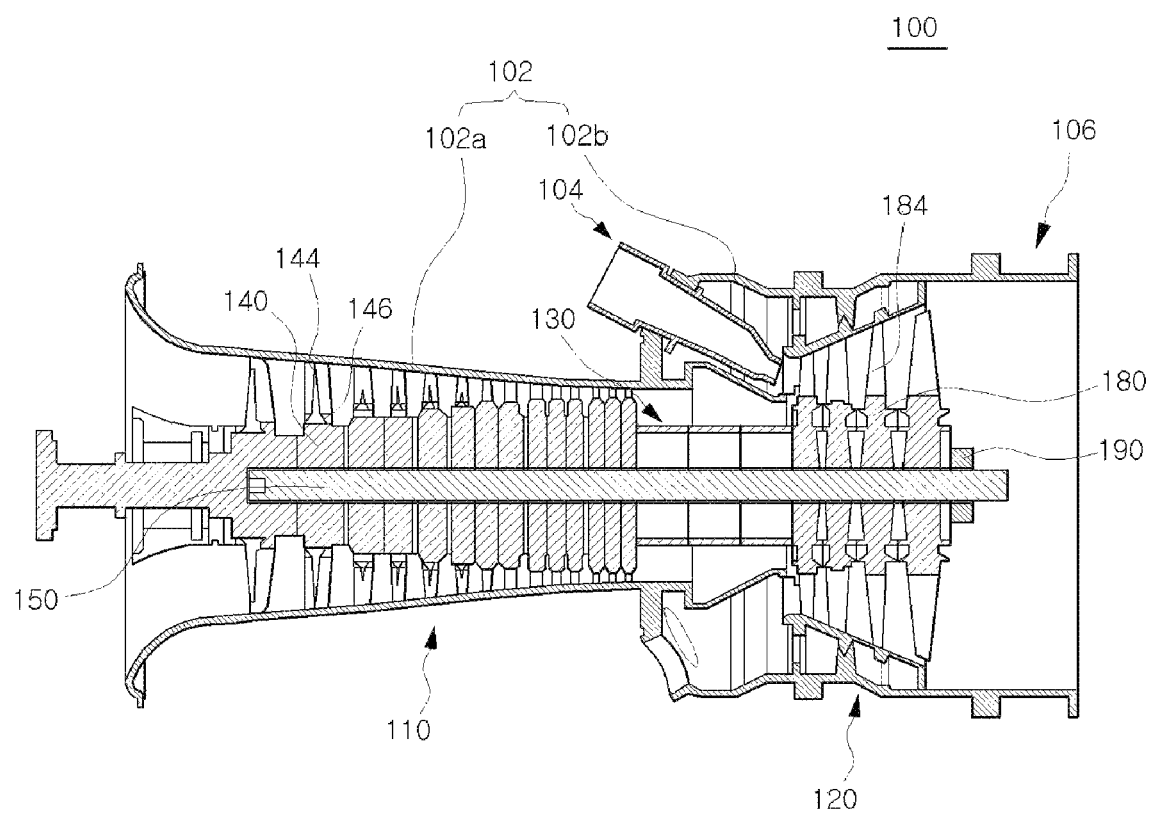

[FIG. 2]
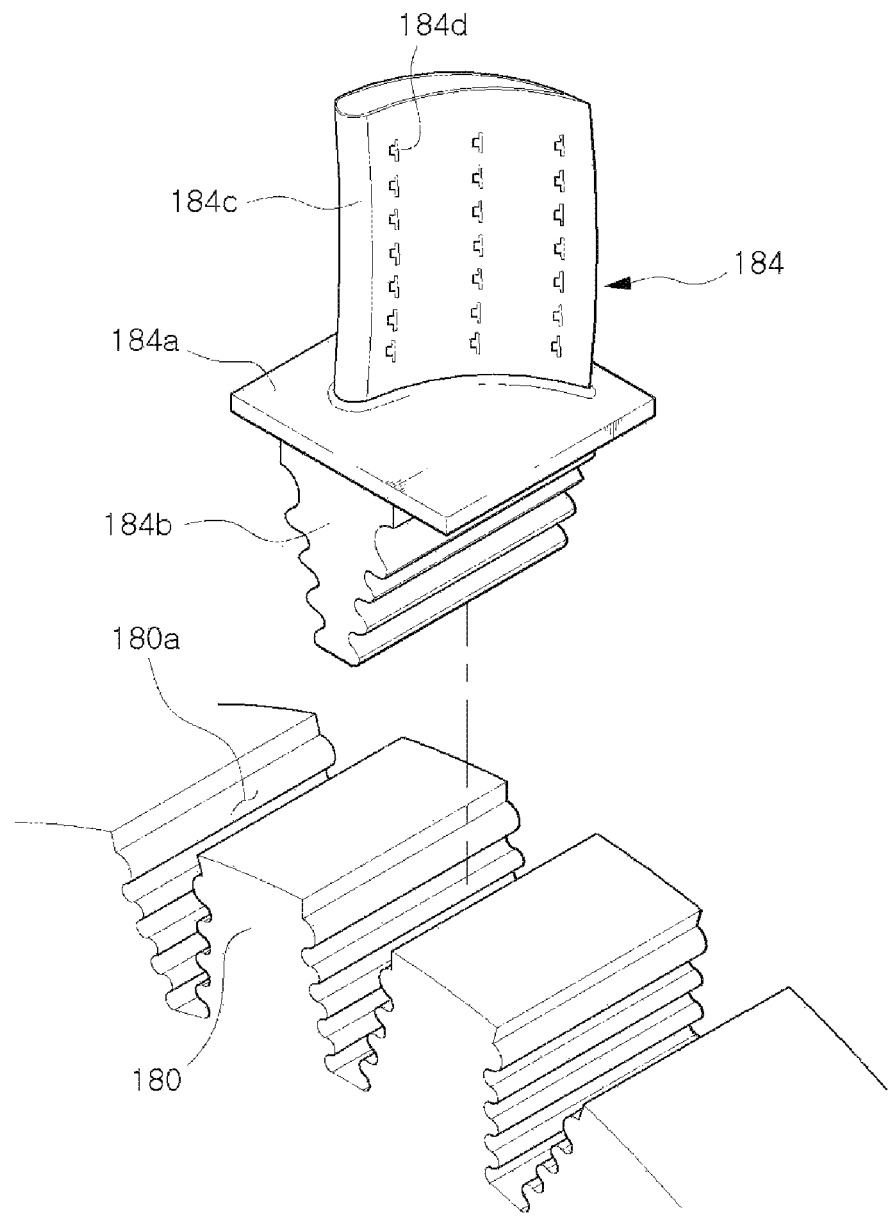

【FIG. 3】
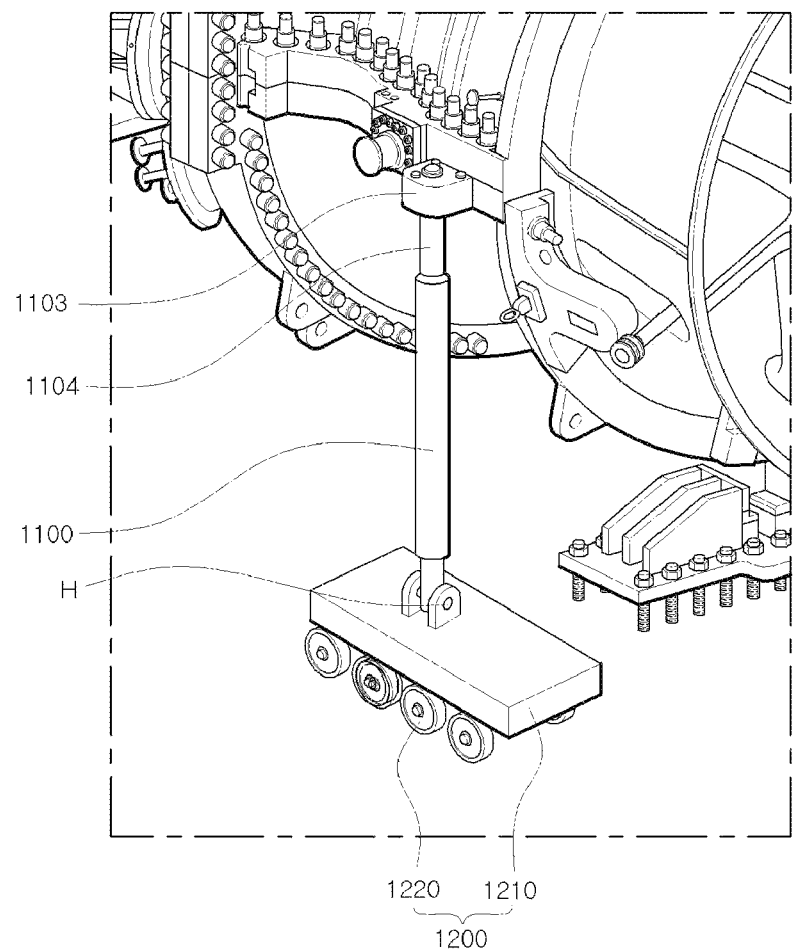

[FIG. 4]
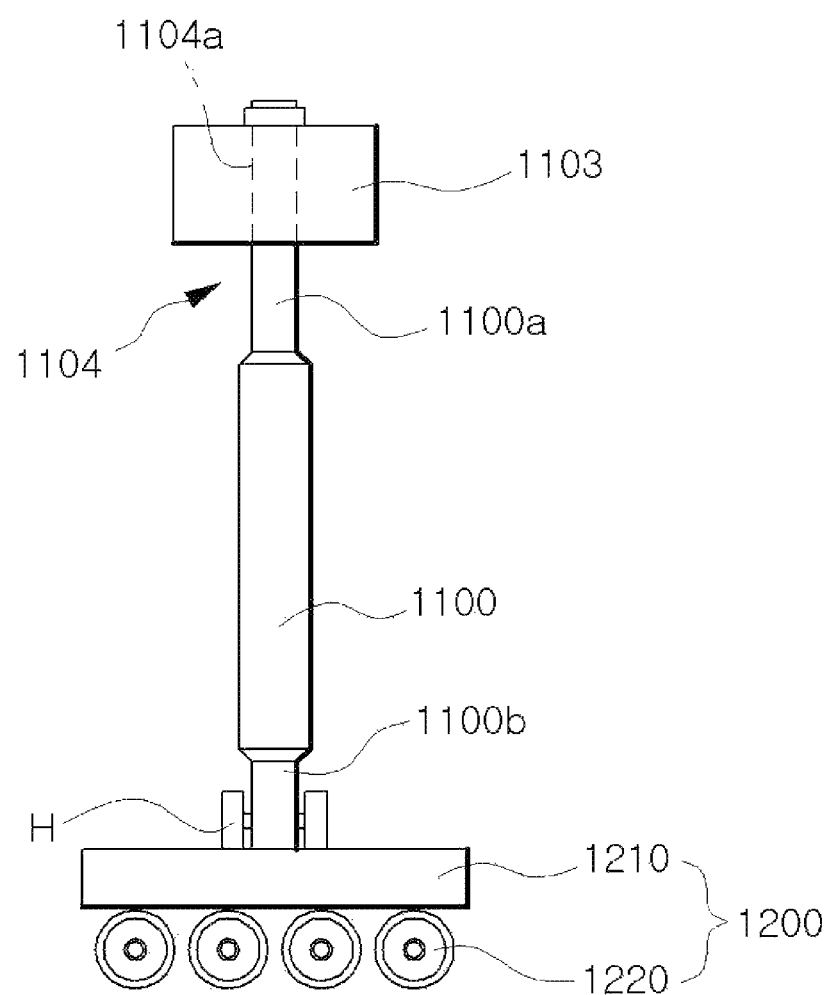

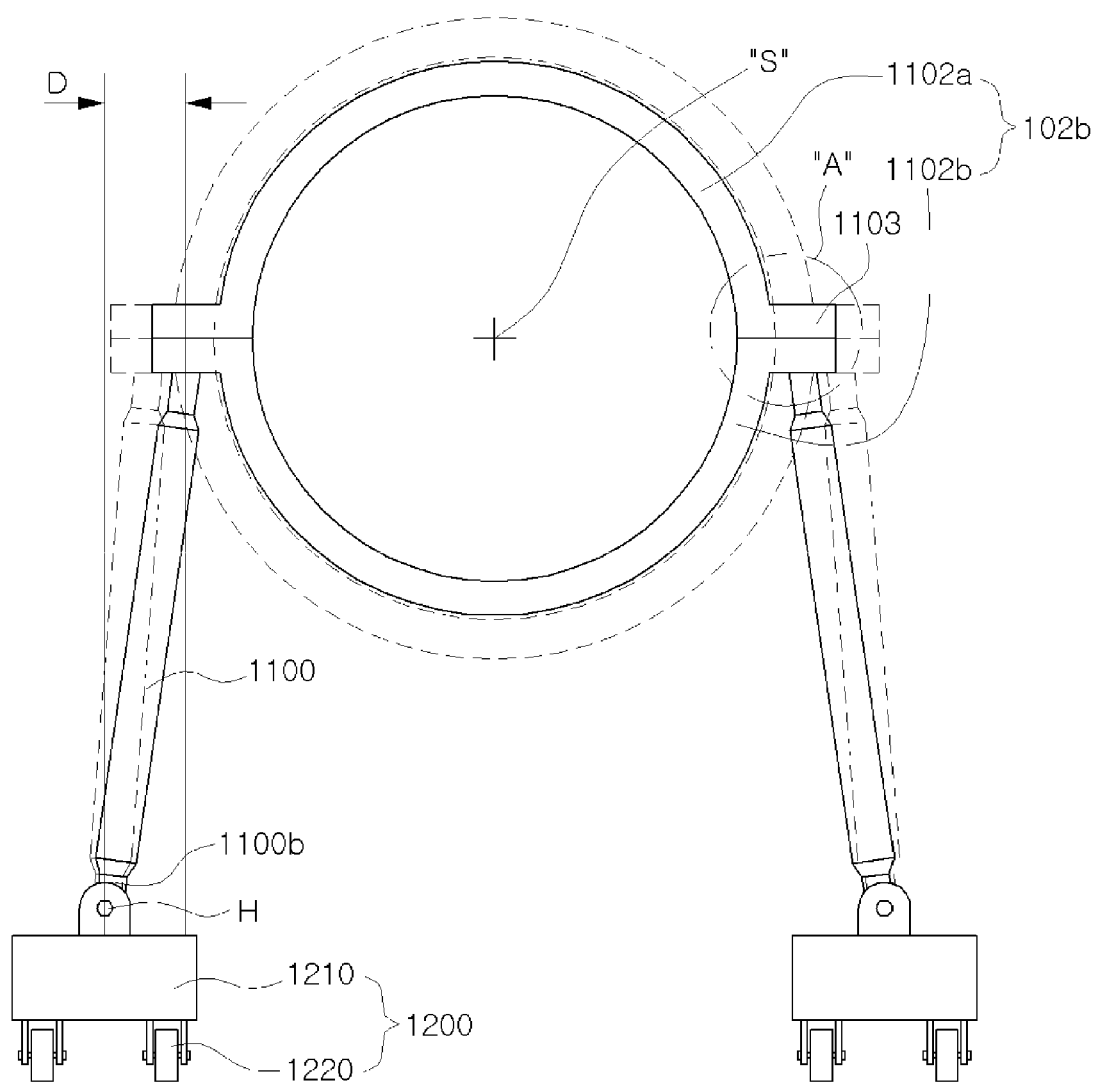
[FIG. 5]

[FIG. 6]
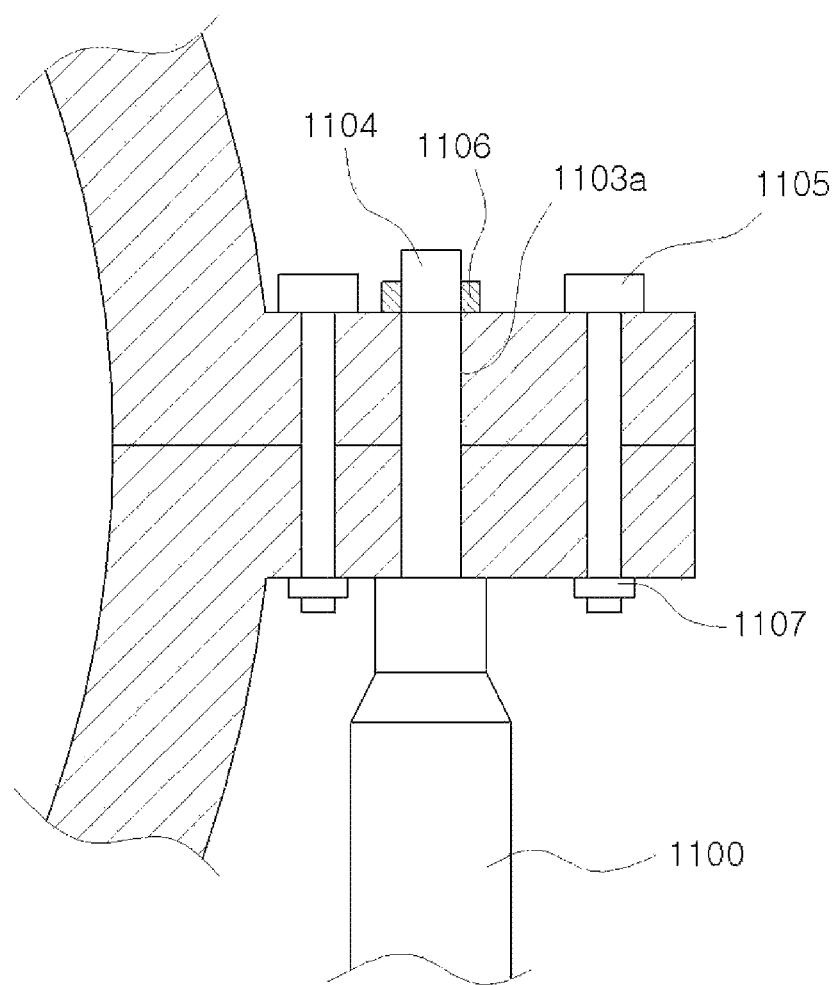

[FIG. 7]
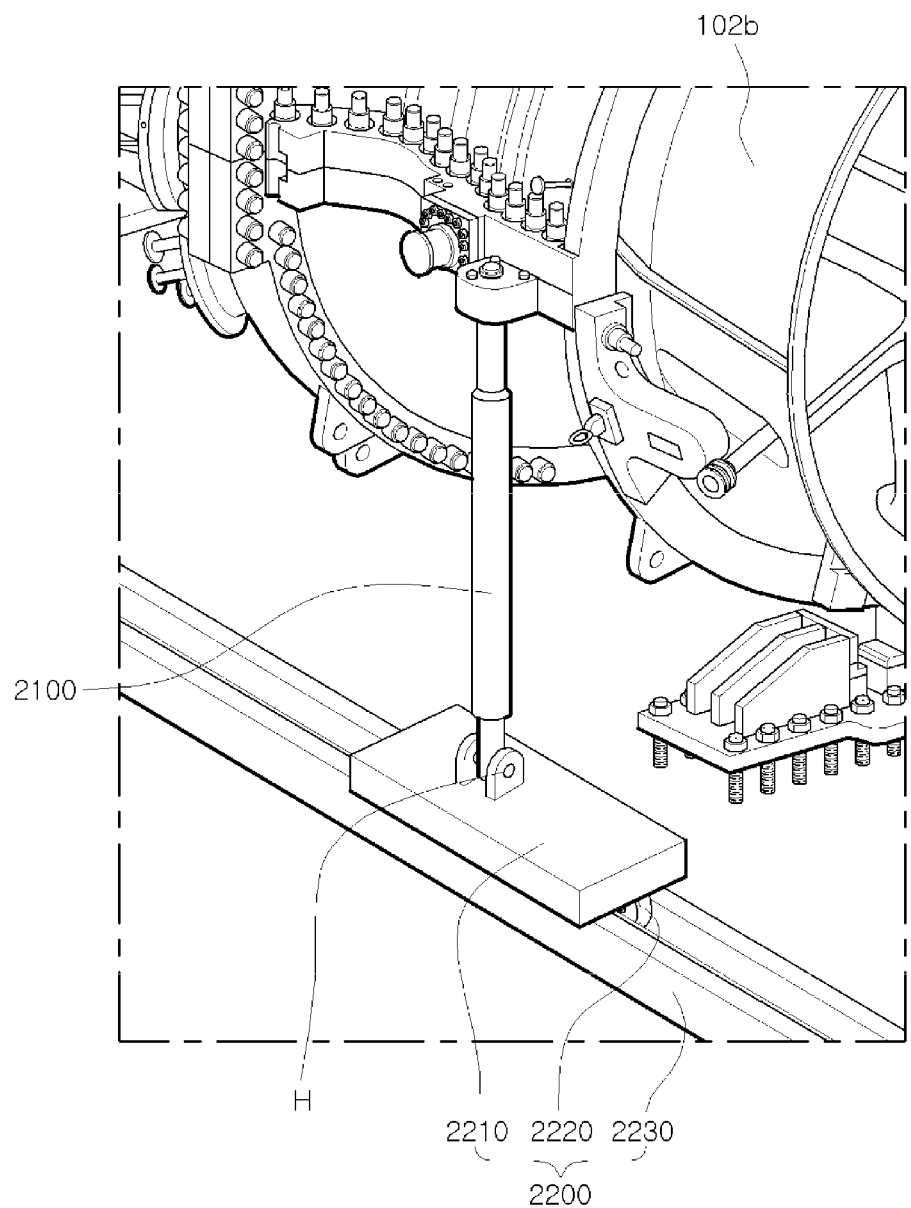

[FIG. 8]
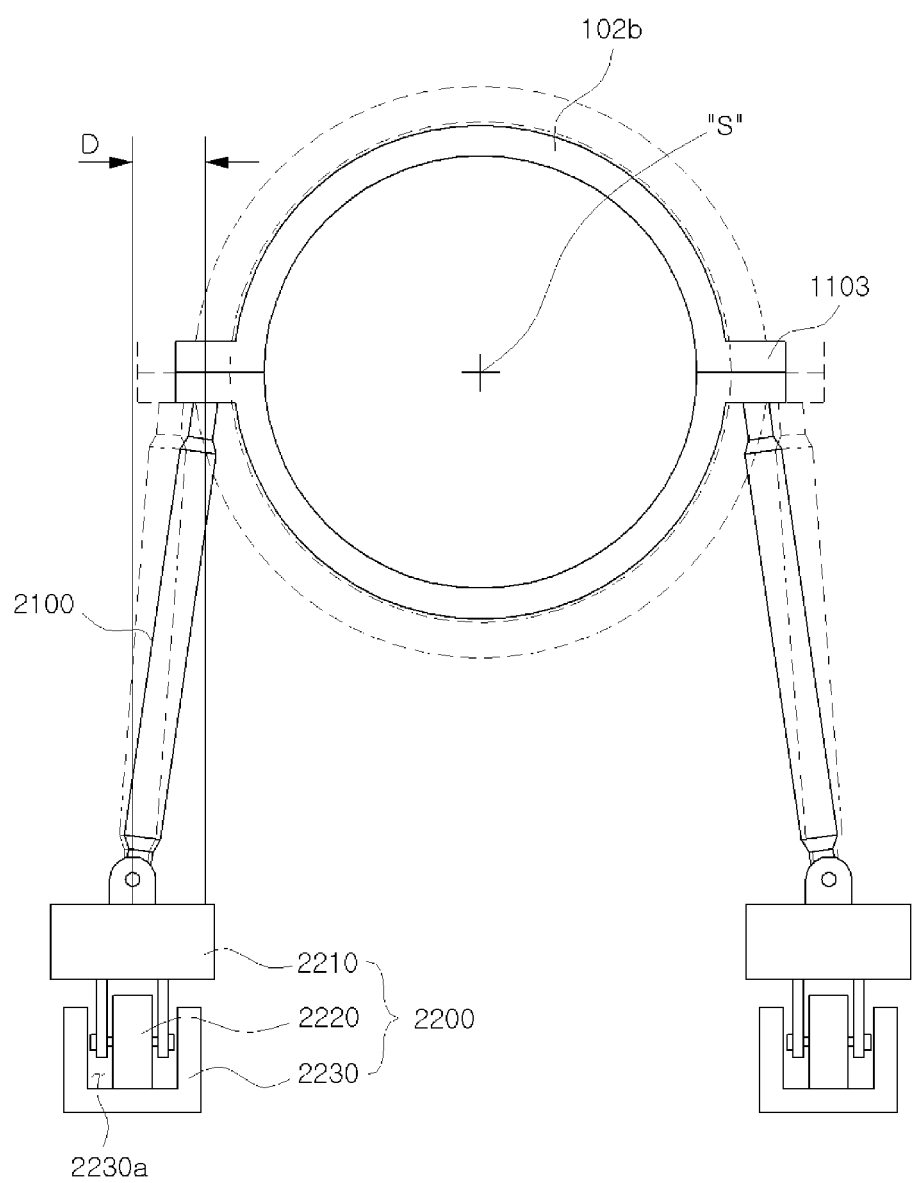

TURBINE SUPPORT STRUCTURE, TURBINE AND GAS TURBINE USING THE SAME

CROSS-REFERENCE TO RELATED APPLICATIONS

This application claims the benefit of Korean Patent Application No. 10-2017-0121198, filed on Sep. 20, 2017, in the Korean Intellectual Property Office, the disclosure of which is incorporated herein in its entirety by reference.

BACKGROUND OF THE DISCLOSURE

Field of the Disclosure

Exemplary embodiments of the present disclosure relate to a turbine support structure, a turbine and a gas turbine using the same, and more particularly, to a turbine support structure having an improved turbine casing support structure for coping with thermal deformation of a turbine casing, and a turbine and a gas turbine using the turbine support structure.

Description of the Related Art

A turbine is a machine which generates rotating force from impulsive force or reaction force using the flow of compressive fluid such as steam or gas. The turbine is classified into a steam turbine using steam, a gas turbine using high-temperature combustion gas, and so forth.

The gas turbine chiefly includes a compressor, a combustor, and a turbine. The compressor includes an air inlet into which air is introduced, and a plurality of compressor vanes and a plurality of compressor blades which are alternately provided in a compressor casing.

The combustor is configured to supply fuel into air compressed by the compressor and ignite the fuel mixture using a burner, thus generating high-temperature and high-pressure combustion gas.

The turbine includes a plurality of turbine vanes and a plurality of turbine blades which are alternately arranged in a turbine casing. Furthermore, a rotor is disposed passing through central portions of the compressor, the combustor, the turbine, and an exhaust chamber.

Opposite ends of the rotor are rotatably supported by bearings. A plurality of disks are fixed to the rotor, and the blades are coupled to the corresponding disks, respectively. A driving shaft of a generator or the like is coupled to an end of the rotor that is adjacent to the exhaust chamber.

The gas turbine does not have a reciprocating component such as a piston of a four-stroke engine. Therefore, mutual friction parts such as a piston-and-cylinder are not present, so that there are advantages in that there is little consumption of lubricant, the amplitude of vibration is markedly reduced unlike a reciprocating machine having high-amplitude characteristics, and high-speed driving is possible.

A brief description of the operation of the gas turbine is as follows. Air compressed by the compressor is mixed with fuel, the fuel mixture is combusted to generate high-temperature combustion gas, and the generated combustion gas is discharged to the turbine. The discharged combustion gas passes through the turbine vanes and the turbine blades and generates rotating force, by which the rotor is rotated.

As such, in the case where high-temperature combustion gas is discharged toward the turbine, the turbine casing may be thermally deformed. Thus, a structure of supporting the turbine casing may be fatigued, whereby a problem arises in that the structure may be damaged.

SUMMARY OF THE DISCLOSURE

An object of the present disclosure is to provide to a turbine support structure in which a structure of supporting a turbine casing is configured to be movable when the turbine casing is thermally deformed while a gas turbine is operated, thus preventing a fatigue fracture of the turbine casing from occurring. The present disclosure has a further object to provide a turbine and a gas turbine using the structure.

In accordance with one aspect of the present disclosure, there is provided a turbine support structure for supporting a turbine casing of a gas turbine. The turbine support structure may include a pair of supports, each having an upper and lower end, for supporting respective opposite side surfaces of the turbine casing at the upper end of either support; and a movable unit installed at the lower end of each support and configured to movably support the lower end of the support.

In accordance with another aspect of the present disclosure, there is provided a turbine configured to pass combustion gas supplied from a combustor to generate a driving force. The turbine may include a turbine casing; a plurality of turbine rotors including a plurality of turbine rotor disks, and a plurality of turbine blades coupled to an outer surface of each of the plurality of turbine rotor disks, the turbine rotors being accommodated in the turbine casing and configured to be rotated by the supplied combustion gas; the above pair of supports; and the above movable unit.

In accordance with one aspect of the present disclosure, a gas turbine may include a compressor configured to draw in and compress air; a combustor configured to generate combustion gas by combusting a mixture of fuel and the compressed air; and the above turbine.

Each movable unit may be spaced outwardly from the corresponding opposite side surface of the turbine casing, so that the corresponding support inclines toward the turbine casing.

The turbine support structure may further include a pair of flange parts protruding outward from the respective opposite side surfaces of the turbine casing; and a bolt part formed on the upper end of each support and coupled to the corresponding flange part.

Each flange part may have an insert hole for receiving the bolt part in order to couple the corresponding support to the corresponding flange part, and the turbine support structure may further include a plurality of auxiliary bolts arranged around the insert hole at positions spaced apart from each other, the auxiliary bolts passing through and coupling to the corresponding flange part.

The turbine casing may include an upper casing and a lower casing arranged to face each other, each of the upper and lower casings having a semi-cylindrical shape, and the turbine support structure may further include a pair of upper flanges protruding outward from the respective opposite ends of the semi-cylindrical shape of the upper casing; a pair of lower flanges protruding outward from the respective opposite ends of the semi-cylindrical shape of the lower casing; and a bolt part formed on the upper end of each support and coupled to the corresponding pair of flanges. The turbine support structure may further include a plurality of auxiliary bolts arranged around each bolt part coupled to the corresponding pair of flanges, the plurality of auxiliary bolts passing through the corresponding pair of flanges in order to couple the upper and lower flanges at the respective opposite side surfaces of the turbine casing.

The lower end of each support may be rotatably coupled to the corresponding movable unit so that the support is rotatable toward an axis of the turbine casing.

The movable unit may include a caster block formed on the lower end of each support, and a plurality of casters mounted to a lower surface of the caster block. Alternatively, the movable unit may include a moving roller provided on the lower end of each support; and a rail having an upper surface in which a movement guide slot is formed for receiving the moving roller. The rail may be disposed parallel to an axis of the turbine casing.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a sectional view illustrating the structure of a gas turbine to which an embodiment of the present disclosure is applied;

FIG. 2 is an exploded perspective view illustrating a turbine rotor disk of FIG. 1;

FIG. 3 is a perspective view of a turbine casing support structure in accordance with a first embodiment of the present disclosure;

FIG. 4 is a side view of the turbine casing support structure of FIG. 3;

FIG. 5 is a front view of the turbine casing support structure in accordance with the first embodiment of the present disclosure;

FIG. 6 is an enlarged view of portion "A" of FIG. 5;

FIG. 7 is a perspective view of a turbine casing support structure in accordance with a second embodiment of the present disclosure; and FIG. 8 is a front view of the turbine casing support structure in accordance with the second embodiment of the present disclosure.

DESCRIPTION OF SPECIFIC EMBODIMENTS

Hereinafter, embodiments of a turbine in accordance with the present disclosure will be described with reference to the accompanying drawings.

FIG. 1 illustrates an embodiment of a gas turbine 100 in accordance with the present disclosure. The gas turbine 100 includes a casing 102. The casing 102 includes a compressor casing 102a and a turbine casing 102b. A diffuser 106, through which combustion gas that has passed through a turbine is discharged, is provided on a read side of the casing 102. A combustor 104 configured to receive compressed air and perform a combustion operation is disposed ahead of the diffuser 106.

Based on a flow direction of air, a compressor 110 is disposed at an upstream side of the casing 102, and a turbine 120 is disposed at a downstream side. In addition, a torque tube 130 which is a torque transmission unit for transmitting rotational torque generated from the turbine 120 to the compressor 110 is disposed between the compressor 110 and the turbine 120.

The compressor 110 is provided with a plurality (e.g., fourteen sheets) of compressor rotor disks 140. The compressor rotor disks 140 are coupled by a tie rod 150 such that they are not spaced apart from each other in an axial direction.

In detail, the compressor rotor disks 140 are arranged along the axial direction of the tie rod 150 passing through respective approximately central portions of the compressor rotor disks 140. Here, facing surfaces of neighboring compressor rotor disks 140 are compressed onto each other by the tie rod 150, whereby the compressor rotor disks 140 cannot rotate relative to each other.

A plurality of blades 144 are radially coupled to an outer circumferential surface of each compressor rotor disk 140. Each of the blades 144 includes a root part 146 by which the blade 144 is coupled to the compressor rotor disk 140.

Vanes (not shown) fixed to the casing 102 are disposed between the compressor rotor disks 140. The vanes are fixed not to be rotated unlike the compressor rotor disks 140. Each vane functions to align the flow of compressed air that has passed through the blades 144 of the compressor rotor disk 140 disposed at an upstream side, and guide the compressed air to the blades 144 of the compressor rotor disk 140 disposed at a downstream side.

A coupling scheme of the root part 146 is classified into a tangential type and an axial type. This may be selected depending on a needed structure of the gas turbine to be used, and may be embodied in a well-known dovetail or fir-tree type structure. In some cases, the blade 144 may be coupled to the compressor rotor disk 140 by using a separate coupling device, e.g., a fastener such as a key or a bolt, other than the above-mentioned coupling scheme.

The tie rod 150 is disposed passing through central portions of the plurality of compressor rotor disks 140 and a plurality of turbine rotor disks 180. One end of the tie rod 150 is coupled to the compressor rotor disk 140 that is disposed at the most upstream side, and the other end thereof is coupled with a fastening nut 190.

The shape of the tie rod 150 is not limited to the shape proposed in FIG. 1 because it may have various structures depending on the structure of the gas turbine. In other words, as shown in the drawing, a single tie rod may be configured in such a way that it passes through the central portions of the rotor disks, a plurality of tie rods may be arranged in a circumferential direction, or a combination thereof is also possible.

Although not shown, a vane functioning as a guide vane may be installed in the compressor of the gas turbine at a position following the diffuser so as to adjust a flow angle of fluid to a designed flow angle, the fluid entering an entrance of the combustor after the pressure of the fluid has been increased. This vane is referred to as a deswirler.

The combustor 104 mixes introduced compressed air with fuel, combusts the fuel mixture to generate high-temperature and high-pressure combustion gas having high energy, and increases, through an isobaric combustion process, the temperature of the combustion gas to a heat resistant limit temperature at which the parts of the combustor and the turbine can endure.

A combustion system of the gas turbine may include a plurality of combustors arranged in a casing formed in a cell shape. Each of the combustors includes a burner including a fuel injection nozzle, etc., a combustor liner forming a combustion chamber, and a transition piece serving as a connector between the combustor and the turbine.

In detail, the liner provides a combustion space in which fuel discharged from the fuel injection nozzle is mixed with compressed air supplied from the compressor and then combusted. The liner may include a flame tube for providing the combustion space in which the fuel mixed with air is combusted, and a flow sleeve for forming an annular space enclosing the flame tube. The fuel injection nozzle is coupled to a front end of the liner, and an ignition plug is coupled to a sidewall of the liner.

The transition piece is connected to a rear end of the liner so as to transfer combustion gas combusted by the ignition plug toward the turbine. An outer wall of the transition piece is cooled by compressed air supplied from the compressor so as to prevent the transition piece from being damaged by high-temperature combustion gas.

To this end, the transition piece has cooling holes through which air can be injected into an internal space of the transition piece. Compressed air cools a main body in the transition piece through the cooling holes and then flows toward the liner.

The cooling air that has cooled the transition piece may flow through the annular space of the liner. Compressed air may be provided as cooling air from the outside of the flow sleeve through cooling holes provided in the flow sleeve, and collide with an outer wall of the liner.

On the one hand, high-temperature and high-pressure combustion gas that has come out of the combustor is supplied into the above-described turbine 120. The supplied high-temperature and high-pressure combustion gas expands and collides with an impeller of the turbine so that reaction force is generated in the turbine, thus inducing rotational torque. The obtained rotational torque is transmitted to the compressor section via the torque tube. Power that exceeds power needed to drive the compressor is used to drive the generator, etc.

The turbine 120 basically has a structure similar to that of the compressor. In detail, the turbine 120 includes a turbine rotor, turbine vanes and a turbine casing.

The turbine rotor is rotated by combustion gas supplied from the combustor when the gas turbine is operated. The turbine rotor includes a plurality of turbine rotor disks 180 mounted in a multi-stage structure to an outer circumferential surface of the tie rod, and a plurality of turbine blades 184. Each turbine rotor disk 180 has a structure similar to that of the compressor rotor disk of the compressor. The turbine rotor disk 180 is also coupled with a plurality of turbine blades 184 which are radially disposed. Each turbine blade 184 may also be coupled to the turbine rotor disk 180 in a dovetail coupling manner or the like. In addition, turbine vanes (not shown) fixed to the casing are also provided between the turbine blades 184 of the turbine rotor disk 180, and function to guide the flow direction of combustion gas that passes through the turbine blades 184.

The turbine casing 102b houses the turbine rotor and the turbine vanes.

Referring to FIG. 2, the turbine rotor disk 180 has an approximately circular plate shape. A plurality of coupling slots 180a are formed in an outer circumferential surface of the turbine rotor disk 180. Each coupling slot 180a has a fir-tree-shaped corrugated surface.

The turbine blade 184 is coupled into the coupling slot 180a. As shown in FIG. 2, the turbine blade 184 includes, in an approximately central portion thereof, a platform part 184a having a planar shape. The platform part 184a has a side surface which comes into contact with a side surface of the platform part 184a of a neighboring turbine blade 184, thus functioning to maintain an interval between the adjacent blades. A root part 184b is provided under a lower surface of the platform part 184a. The root part 184b has a so-called axial-type structure so that the root part 184b is inserted into the coupling slot 180a of the turbine rotor disk 180 along an axial direction of the turbine rotor disk 180.

The root part 184b has an approximately fir-tree-shaped corrugated portion corresponding to the fir-tree-shaped corrugated surface formed in the coupling slot 180a. Here, the coupling structure of the root part 184b is not limited to a fir-tree shape, and may be formed to have a dovetail structure.

A blade part 184c is formed on an upper surface of the platform part 184a. The blade part 184c is formed to have an optimized profile according to specifications of the gas turbine. The blade part 184c includes a leading edge which is disposed at an upstream side with respect to the combustion gas flow direction, and a trailing edge which is disposed at a downstream side.

Here, unlike the blade 144 of the compressor 110, the blade 184 of the turbine 120 comes into direct contact with high-temperature and high-pressure combustion gas. Since the combustion gas has a high temperature reaching 1700° C., a cooling unit is required. To this end, the gas turbine includes a cooling passage through which compressed air drawn out from some portions of the compressor 110 is supplied to the blades 184 of the turbine 120.

The cooling passage may extend outside the casing 102 (defined as an external passage), or extend through the interior of the rotor disk (defined as an internal passage). Alternatively, both the external passage and the internal passage may be used. As shown in FIG. 2, a plurality of film cooling holes 184d are formed in a surface of the blade part 184c. The film cooling holes 184d communicate with a cooling passage (not shown) formed in the blade part 184c and function to supply cooling air to the surface of the blade part 184c.

FIG. 3 illustrates a turbine/turbine casing supported by a turbine casing support structure in accordance with a first embodiment of the present disclosure. FIG. 4 shows the turbine casing support structure of FIG. 3. FIG. 5 shows a turbine/turbine casing supported by the turbine casing support structure in accordance with the first embodiment of the present disclosure, and FIG. 6 details a portion A of FIG. 5.

Referring to FIGS. 3 to 6, the turbine casing support structure in accordance with the first embodiment of the present disclosure includes a pair of supports 1100 and a pair of movable units 1200.

The supports 1100, each having a circular rod shape, are configured to support respective opposite side surfaces of the turbine casing 102b.

The turbine casing 102b has a structure in which an upper casing 1102a and a lower casing 1102b, each of which has a semi-cylindrical shape, are coupled facing each other. A flange part 1103 protruding outward is formed on each of the junctions between the upper casing 1102a and the lower casing 1102b. An insert hole 1103a is formed in the flange part 1103.

A bolt part 1104 having an external thread on an outer surface is provided on an upper end of each support 1100. The bolt part 1104 is inserted through the insert hole 1103a of the flange part 1103 and then coupled to the flange part 1103. A nut 1106 is provided on an upper surface of the flange part 1103 and threaded over the bolt part 1104 to fix the bolt part 1104 to the flange part 1103.

A plurality of auxiliary bolts 1105 for coupling the flange part of the upper casing 1102a and the flange part of the lower casing 1102b to each other are provided through a portion of the flange part 1103 that encloses the bolt part 1104. An auxiliary nut 1107 is provided on a lower end of each of the auxiliary bolts 1105 so as to fix the auxiliary bolt 1105 to the flange part 1103.

A lower end 1100b of each support 1100 is rotatably coupled to the corresponding movable unit 1200 by a hinge shaft H so as to allow the support 1100 to rotate toward the turbine casing 102b.

Each of the movable unit 1200 is disposed at a position spaced outwardly from the corresponding flange part of the turbine casing 102b by a predetermined distance D, so that the support 1100 is disposed to be inclined toward the turbine casing 102b.

When the gas turbine is operated, high-temperature combustion gas flows through the interior of the turbine casing 102b, whereby the turbine casing 102b is heated and expanded. As the turbine casing 102b expands, the supports 1100 rotate outward around the hinge shafts H, and the upper ends of the supports 1100 move outward.

Each of the movable units 1200 includes a caster block 1210 and a caster 1220. The caster block 1210 has a rectangular cuboidal shape, whose upper portion is rotatably coupled to the support 1100 by the hinge shaft H.

A plurality of casters 1220 are mounted to a lower portion of the caster block 1210. The casters 1220 are disposed to allow the caster block 1210 to move in a direction parallel to an center axis S of the turbine casing 102b. The casters 1220 may be disposed in two rows so as to stably support the caster block 1210.

In the case where the turbine casing 102b is thermally deformed in the center axis direction while the gas turbine is operated, the supports 1100 and the movable units 1200 are moved in the center axis direction of the turbine casing 102b by the thermal deformation of the turbine casing 102b. Therefore, even when the thermal deformation of the turbine casing 102b is repeatedly caused, because the supports 1100 can be moved by the movable units 1200, a fatigue fracture may be prevented from occurring in the junctions between the supports 1100 and the flange parts 1103 or the movable units 1200.

FIGS. 7 and 8 show a turbine/turbine casing supported by the turbine casing support structure in accordance with a second embodiment of the present disclosure.

Referring to FIGS. 7 and 8, the turbine casing support structure in accordance with the second embodiment of the present disclosure includes a pair of supports 2100 and a pair of movable units 2200.

The turbine casing support structure in accordance with the second embodiment of the present disclosure is a turbine casing support structure having a structural modification of the movable unit in accordance with the preceding first embodiment.

In the following description of the configuration of the turbine casing support structure in accordance with the second embodiment of the present disclosure, descriptions of the same components as those of the first embodiment will be omitted, and only a configuration related to the movable unit 2200 different from that of the first embodiment will be explained.

Each movable unit 2200 in accordance with the second embodiment of the present disclosure includes a moving roller 2220 and a rail 2230.

A rail block 2210 having a rectangular cuboidal shape is provided under a lower end of the support 2100. The moving roller 2220 is mounted to a lower surface of the rail block 2210. The moving roller 2220 is disposed to be movable in a direction parallel to the center axis of the turbine casing 102b. The rail 2230 is provided under the moving roller 2220.

A movement guide slot 2230a, in which the moving roller 2220 is received and moved, is formed in an upper surface of the rail 2230.

In the case where the turbine casing 102b is thermally deformed in the center axis direction while the gas turbine is operated, the supports 2100 are moved along the rails 2230 in a direction parallel to the center axis of the turbine casing 102b. Therefore, even when the thermal deformation of the turbine casing 102b is repeatedly caused, because the supports 2100 can be moved along the rails 2230, a fatigue fracture may be prevented from occurring in the junctions between the supports 2100 and the flange parts or the movable units 2200.

As described above, in accordance with the present disclosure, a structure of supporting a turbine casing is configured to be movable for coping with thermal deformation of the turbine casing, thus preventing a fatigue fracture of the structure of supporting the turbine casing from being caused by thermal deformation of the turbine casing which occurs when a gas turbine is operated.

While the present disclosure has been described with respect to the specific embodiments, it will be apparent to those skilled in the art that various changes and modifications may be made without departing from the spirit and scope of the disclosure as defined in the following claims.

What is claimed is:

1. A turbine support structure for supporting a turbine casing of a turbine in a gas turbine, the turbine support structure comprising:
    a pair of supports, each support of the pair of supports having an upper end and a lower end, the upper ends of the pair of supports respectively fixed with respect to opposite side surfaces of the turbine casing, the pair of supports configured to support the turbine casing at the opposite side surfaces of turbine casing;
    a pair of movable units respectively installed at the lower end of each support and configured to support the lower end of each support and to move the lower end of each support in a direction parallel to a center axis of the turbine casing;
    pair of flange parts protruding outward from the respective opposite side surfaces of the turbine casing; and
    a bolt part formed on the upper end of each support and coupled to the corresponding flange part,
    wherein the turbine comprises:
    a plurality of turbine rotors including a plurality of turbine rotor disks and a plurality of turbine blades coupled to an outer surface of each of the plurality of turbine rotor disks;
    a plurality of turbine vanes disposed between the plurality of turbine blades; and
    the turbine casing for housing the turbine rotors and the turbine vanes configured to guide a flow direction of combustion gas, the turbine rotors being mounted in a multi-stage structure on an outer circumferential surface of a tie rod and configured to be rotated by the combustion gas supplied from a combustor when the gas turbine is operated.

2. The turbine support structure according to claim 1, wherein each movable unit of the pair of movable units is spaced outwardly from the corresponding opposite side surface of the turbine casing, so that the corresponding support inclines toward the turbine casing.

3. The turbine support structure according to claim 1, wherein each flange part has an insert hole for receiving the bolt part in order to couple the corresponding support to the corresponding flange part, and wherein the turbine support structure further comprises a plurality of auxiliary bolts arranged around the insert hole at positions spaced apart from each other, the auxiliary bolts passing through and coupling to the corresponding flange part.

4. The turbine support structure according to claim 1, wherein the turbine casing comprises an upper casing and a lower casing arranged to face each other, each of the upper and lower casings having a semi-cylindrical shape, and wherein the turbine support structure further comprises:
a pair of upper flanges protruding outward from the respective opposite ends of the semi-cylindrical shape of the upper casing;
a pair of lower flanges protruding outward from the respective opposite ends of the semi-cylindrical shape of the lower casing; and
a bolt part formed on the upper end of each support and coupled to the corresponding pair of flanges.

5. The turbine support structure according to claim 4, wherein the turbine support structure further comprises a plurality of auxiliary bolts arranged around each bolt part coupled to the corresponding pair of flanges, the plurality of auxiliary bolts passing through the corresponding pair of flanges in order to couple the upper and lower flanges at the respective opposite side surfaces of the turbine casing.

6. The turbine support structure according to claim 1, wherein the lower end of each support is rotatably coupled to the corresponding movable unit so that the support is rotatable toward an axis of the turbine casing.

7. The turbine support structure according to claim 1, wherein the pair of movable units comprise a caster block formed on the lower end of each support, and a plurality of casters mounted to a lower surface of the caster block.

8. A turbine configured to pass combustion gas supplied from a combustor to generate a driving force, the turbine comprising:
a turbine casing;
a plurality of turbine rotors including a plurality of turbine rotor disks, and a plurality of turbine blades coupled to an outer surface of each of the plurality of turbine rotor disks, the turbine rotors being accommodated in the turbine casing and configured to be rotated by the supplied combustion gas;
a pair of supports, each support of the pair of supports having an upper end and a lower end, the upper ends of the pair of supports respectively fixed with respect to opposite side surfaces of the turbine casing, the pair of supports configured to support the turbine casing at the opposite side surfaces of turbine casing;
a pair of movable units respectively installed at the lower end of each support and configured to support the lower end of each support and to move the lower end of each support in a direction parallel to a center axis of the turbine casing;
a pair of flange parts protruding outward from the respective opposite side surfaces of the turbine casing; and
a bolt part formed on the upper end of each support and coupled to the corresponding flange part,
wherein the turbine casing houses the plurality of turbine rotor disks and the plurality of turbine blades coupled to the outer surface of each of the plurality of turbine rotor disks.

9. The turbine according to claim 8, wherein each movable unit of the pair of movable units is spaced outwardly from the corresponding opposite side surface of the turbine casing, so that the corresponding support inclines toward the turbine casing.

10. The turbine according to claim 8, wherein the turbine casing comprises an upper casing and a lower casing arranged to face each other, each of the upper and lower casings having a semi-cylindrical shape, and
wherein the turbine support structure further comprises:
a pair of upper flanges protruding outward from the respective opposite ends of the semi-cylindrical shape of the upper casing;
a pair of lower flanges protruding outward from the respective opposite ends of the semi-cylindrical shape of the lower casing; and
a bolt part formed on the upper end of each support and coupled to the corresponding pair of flanges.

11. The turbine according to claim 10, wherein the turbine support structure further comprises a plurality of auxiliary bolts arranged around each bolt part coupled to the corresponding pair of flanges, the plurality of auxiliary bolts passing through the corresponding pair of flanges in order to couple the upper and lower flanges at the respective opposite side surfaces of the turbine casing.

12. The turbine according to claim 8, wherein the lower end of each support is rotatably coupled to the corresponding movable unit so that the support is rotatable toward an axis of the turbine casing.

13. The turbine according to claim 8, wherein the pair of movable units comprise a caster block formed on the lower end of each support, and a plurality of casters mounted to a lower surface of the caster block.

14. A gas turbine comprising:
a compressor configured to draw in and compress air;
a combustor configured to generate combustion gas by combusting a mixture of fuel and the compressed air; and
a turbine comprising:
a turbine casing;
a plurality of turbine rotors including a plurality of turbine rotor disks, and
a plurality of turbine blades coupled to an outer surface of each of the plurality of turbine rotor disks, the turbine rotors being accommodated in the turbine casing and configured to be rotated by the supplied combustion gas;
a pair of supports, each support of the pair of supports having an upper end and a lower end, the upper ends of the pair of supports respectively fixed with respect to opposite side surfaces of the turbine casing, the pair of supports configured to support the turbine casing at the opposite side surfaces of turbine casing;
a pair of movable units respectively installed at the lower end of each support and configured to support the lower end of each support and to move the lower end of each support in a direction parallel to a center axis of the turbine casing;
a pair of flange carts protruding outward from the respective opposite side surfaces of the turbine casing; and
a bolt part formed on the upper end of each support and coupled to the corresponding flange cart,
wherein the turbine casing houses the plurality of turbine rotor disks and the plurality of turbine blades coupled to the outer surface of each of the plurality of turbine rotor disks.

* * * * *